G. W. McCAULEY & W. L. CROWSON.

COTTON-CLEANER.

No. 7,074. Reissued April 25, 1876.

WITNESSES:

Jas. E. Hutchinson

H. C. Hazard.

INVENTORS.

G. W. McCauley & W. L. Crowson by Pindle & Co. their attys

N. PETERS, PHOTO-LITHOGRAPHER, WASHINGTON, D. C.

UNITED STATES PATENT OFFICE.

GEORGE W. McCAULEY, OF PLEASANT PLAINS, ARKANSAS, AND WILLIAM L. CROWSON, OF MEMPHIS, TENNESSEE; SAID McCAULEY ASSIGNOR OF ALL HIS RIGHT, AND SAID CROWSON ASSIGNOR OF ONE-HALF INTEREST, TO ALLISON BROTHERS.

IMPROVEMENT IN COTTON-CLEANERS.

Specification forming part of Letters Patent No. 162,086, dated April 13, 1875; reissue No. 7,074, dated April 25, 1876; application filed March 11, 1876.

*To all whom it may concern:*

Be it known that we, GEORGE W. McCAULEY, of Pleasant Plains, Independence county, State of Arkansas, and WILLIAM L. CROWSON, of Memphis, Shelby county, State of Tennessee, have invented certain new and useful Improvements in Cotton-Cleaners; and do hereby declare that the following is a full, clear, and exact description of the said invention, reference being had to the accompanying drawings, making a part of this specification, in which—

Figure 1:
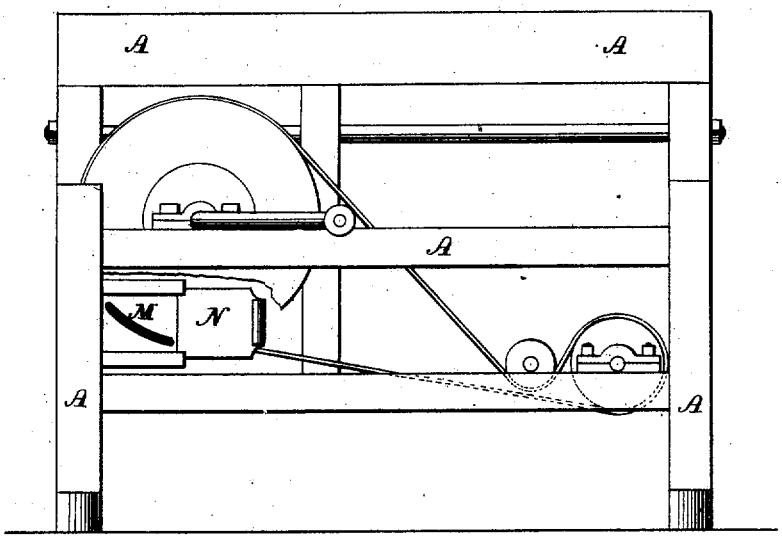
Figure 2:
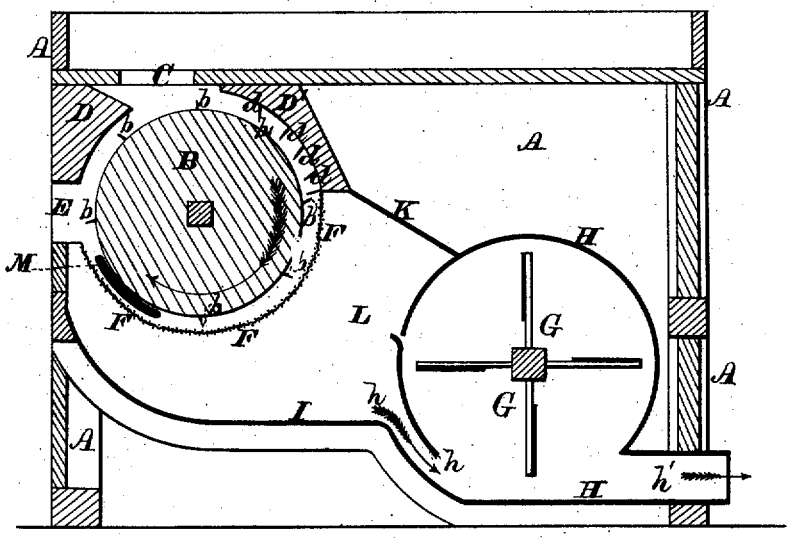

Figure 1 is a side elevation of our improved machine, and Fig. 2 is a vertical central section of the same upon a line passing from front to rear.

Letters of like name and kind refer to like parts in each of the figures.

In the cleaning of seed-cotton the greatest obstacle heretofore encountered has been the dust thrown off, which dust has been so dense and offensive as to materially interfere with the operation, and render difficult the securing of proper attention from the operatives.

Many expedients have been employed for lessening this evil, among which was a fan for blowing air through the beating mechanism; but experience has shown that while such a blast increased the speed with which the work was done, and enabled better work to be accomplished, it resulted in largely increasing the annoyance from dust, as said blast created a pressure within the machine, and caused each crevice and joint to emit a stream of air and dust, by which means such employment of an air-blast has of necessity been discontinued.

To obviate this objection, and to enable seed-cotton to be easily and thoroughly cleaned, is the design of our invention, which consists, principally, in combining with the space beneath the reticulated or open-work casing which incloses the beating or thrashing mechanism an exhaust fan, that operates to withdraw downward dust and dirt, which are separated from the cotton being cleaned, substantially as and for the purpose hereinafter shown. It consists, further, in combining, with beating or thrashing mechanism for cleaning cotton, which is partially inclosed on its lower side by an open-work or reticulated diaphragm, and is provided with an inclosed air-space below or in rear of the feed and discharge openings, an exhaust-fan which communicates with said space, substantially as and for the purposes hereinafter set forth. It consists, further, in the combination and relative arrangement of the operative mechanism, substantially as and for the purpose hereinafter shown.

In the annexed drawings, A represents the frame or casing of our machine, within which, near one end and above its vertical center, is journaled a cylinder, B, that extends between the sides of said casing, and upon its periphery is provided with a number of metal teeth, *b* and *b*, which have an outward and a rearward inclination. Immediately over the cylinder B an opening, C, is provided, in and through the upper side of the casing A, for the introduction of cotton, while upon each side of such opening is provided a concave, D and D′, that extend downward nearly to the vertical center of said cylinder, the rear of which concave D′ is provided with teeth *d* and *d*, which have an inward and a forward inclination. A discharge-opening, E, is formed in and through the front end of the casing A, upon a line with the axial center of the cylinder B, and from the lower edge of such opening a wire-screen, F, passes downward, rearward, and upward in a curve, and is attached to the lower edge of the rear concave D′. Within the rear end, at the lower side of the casing A, is placed an exhaust-fan, G, the axis of which is parallel with the axis of the cylinder B, which fan is inclosed within a casing, H, that is provided with an inlet-opening, *h*, at its front lower side, and an outlet-opening, *h′*, at its lower rear side. From the lower side of the inlet-opening *h* a sheet-metal diaphragm, I, extends forward and upward in a curve, and is secured to the forward end of the casing A at a point just below the opening E, while a second diaphragm, K, extends between the upper forward side of the casing H upward and forward to the lower end of the rear concave D′. Each of said diaphragms extends between the sides of the casing A, and incloses a space, L, which forms a chute that furnishes communication between the cylinder B and the exhaust-fan G.

The cylinder B and fan G being rotated in the direction shown by the arrows, the operation of the machine is as follows: Seed-cotton is fed into the opening C, where it is caught by the cylinder B, and drawn through the space between the same and the concave D′, during which operation said cotton is thoroughly beaten or hackled, so as to separate therefrom all adhering particles of dust and dirt. From the concave D′ the cotton is moved over the screen F, where the strong draft of air produced by the exhaust-fan causes the dust and dirt, which have become separated by the thrashing mechanism, to be drawn through said screen into the chute L, and from thence into the fan-casing, whence they are discharged through the opening *h′* into a pipe which extends to the outside of the gin-house.

For the purpose of regulating the draft at the induction and eduction ports, an opening, M, is provided in and through each side of the casing A, through which air is admitted to the space between the cylinder and screen. A slide, N, is provided for each opening M, by means of which the same may be partially or entirely closed, as occasion requires.

As the air which passes to the blower enters principally through the feed and discharge openings, it will be seen that it is compelled to pass through the entire space occupied by the cotton while being thrashed, and that during the whole of the time said cotton is in the machine, it is subject to the cleaning operation of the exhaust-draft, by which means a larger proportion of dust and dirt are removed than would otherwise be practicable. Again, by locating the fan so as to cause air to pass downward through the cotton, the separation of both light and heavy particles of dirt is effected, and the air-draft operates, in conjunction with the force of gravity, to produce the desired result, while by the location of said fan above the beating mechanism the reverse would be true, and only the lighter portions of dirt would be removed.

By use of this machine cotton may be cleaned in a most thorough manner, without causing any dust or dirt to pass outward into the room to injure and annoy the operatives, or to soil other cotton, while by the use of a pressure-blower the reverse is true.

Having thus fully set forth the nature and merits of our invention, what we claim as new is—

1. In combination with mechanism for cleaning cotton by thrashing or beating, and with a reticulated or open-work diaphragm for inclosing the lower side of such mechanism, an exhaust-fan which communicates with the space beneath said diaphragm, and operates to withdraw downward such dust and dirt as are separate from said cotton, substantially as and for the purpose shown.

2. In combination with the beating or thrashing mechanism for cleaning cotton, which is partially inclosed on its lower side by an open-work or reticulated diaphragm, and provided with an inclosed space below or in rear of the feed and discharge openings, an exhaust-fan which communicates with said space, in the manner and for the purpose substantially as set forth.

3. The hereinbefore-described machine, in which the beating-cylinder B *b b*, concave D′ *d d*, screen F, exhaust-fan G, casing A, induction-opening C, eduction-opening E, casing H *h h′*, and chute L are combined and relatively arranged in the manner and for the purpose substantially as shown.

In testimony whereof we have hereunto set our hands.

GEO. W. McCAULEY.
WM. L. CROWSON.

Witnesses as to G. W. McCauley:
Albert F. Dod,
Alex. Allison.

Witnesses as to W. L. Crowson:
John R. Young,
William Fitch.